US006247906B1

(12) United States Patent
Pijanowski

(10) Patent No.: US 6,247,906 B1
(45) Date of Patent: Jun. 19, 2001

(54) COMBINED PUMP AND MOTOR DEVICE

(76) Inventor: Joseph M. Pijanowski, 8227 Clarendon Hills Rd., Claredon Hills, IL (US) 60514

(*) Notice: Subject to any disclaimer, the term of this patent is extended or adjusted under 35 U.S.C. 154(b) by 0 days.

(21) Appl. No.: 09/357,432

(22) Filed: Jul. 20, 1999

Related U.S. Application Data

(60) Provisional application No. 60/136,435, filed on May 28, 1999.

(51) Int. Cl.[7] ...................................................... F04B 49/00
(52) U.S. Cl. ...................................... 417/410.4; 417/410.3
(58) Field of Search ............................. 417/410.4, 410.3, 417/352, 353; 418/61.1

(56) References Cited

U.S. PATENT DOCUMENTS 4,412,794 * 11/1983 Presley ................................ 418/61.1
4,677,359 * 6/1987 Enami et al. ......................... 318/696
5,370,508 * 12/1994 Barthod et al. ................... 417/410.3
5,421,706 * 6/1995 Martin, Sr. ........................... 417/371
5,649,811 * 7/1997 Krol, Jr. et al. ..................... 417/353

* cited by examiner

*Primary Examiner*—Teresa Walberg
*Assistant Examiner*—Quang Van
(74) *Attorney, Agent, or Firm*—Niro, Scavone, Haller & Niro Chicago, IL

(57) ABSTRACT

A compact, electronically operated, rotary positive displacement pumping device having a stator which functions as an electric motor stator and also as pump stator, a rotor or rotors which function as electric motor rotor or rotors and also as pump rotor or rotors, and a highly efficient and effective magnetic flux path which has low reluctance, said flux path being used in a magnetic drive arrangement to impart rotation to the rotor or rotors to create a pumping action.

11 Claims, 17 Drawing Sheets

COMBINED PUMP AND MOTOR DEVICE

This application claims benefit of provisional application Ser. No. 60,136,435 filed May 28, 1999.

BACKGROUND OF THE INVENTION

This invention relates to lowering the high cost of manufacture, and reducing the size and weight of rotary positive displacement electric motor driven gas, vapor and liquid pumps used to provide pressure or vacuum.

Over the years various rotary electric motor driven, gas, vapor and liquid pumping devices have been developed to supply pressure or vacuum for various applications with varying degrees of success. Many devices typically use a separate electric motor to drive a separate pump. Other prior devices use a combined motor and rotary screw pump design.

Prior pumping devices have high manufacturing costs, high part count, low manufacturing efficiency, are noisy in operation, employ bulky and inefficient mufflers, and occupy a lot of space with more weight.

SUMMARY OF THE INVENTION

An improved electric pump is provided for use in various pressure and/or vacuum applications. Advantageously, the efficient pump has low electrical consumption, simplified control, operating and wiring requirements, reduced design restrictions, long service life, low mechanical part count, increased performance and manufacturing efficiency, and significantly reduced manufacturing costs. Desirably, the dependable pump is easy to use, cooler in operation, is multi and/or variable speed, has lower starting amp draw and lower amp draw while running than conventional pumps while achieving high electrical and magnetic efficiency, increased performance, quiet operation, and occupying less space with less weight.

A preferred embodiment of the pump uses a compact one piece pump/motor stator, an efficient, effective and low reluctance magnetic flux path, nonmagnetic endplates, a combined gear pump/motor design or a combined rotary vane pump/motor design both with simplified control requirements, active electronic noise reduction and/or cancellation, and a friction and wear reducing coating applied to parts subject to friction and wear. This provides for excellent efficiency of manufacture, low manufacturing cost, low mechanical part count, high reliability, long life, increased pressure output, quiet operation and a pump which is also very compact.

The novel electric pump has: a rotor or rotors which function and operate as the electric switched reluctance motor rotor or rotors and also as the rotary vane pump rotor or gear pump rotors; a compact one piece stator which functions and operates as the electric switched reluctance motor stator and also as the rotary vane pump stator or gear pump stator, an efficient and effective magnetic flux path; compact, nonmagnetic and lightweight endplates which function as the motor endplates and also as the pump endplates; a friction and wear reducing coating applied to parts subject to friction and wear; audio transducers which are utilized for active noise control; and an electronic computer controller to operate, control and regulate the pump/motor and also to control, operate, and regulate the audio transducers to provide active noise reduction and/or cancellation.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
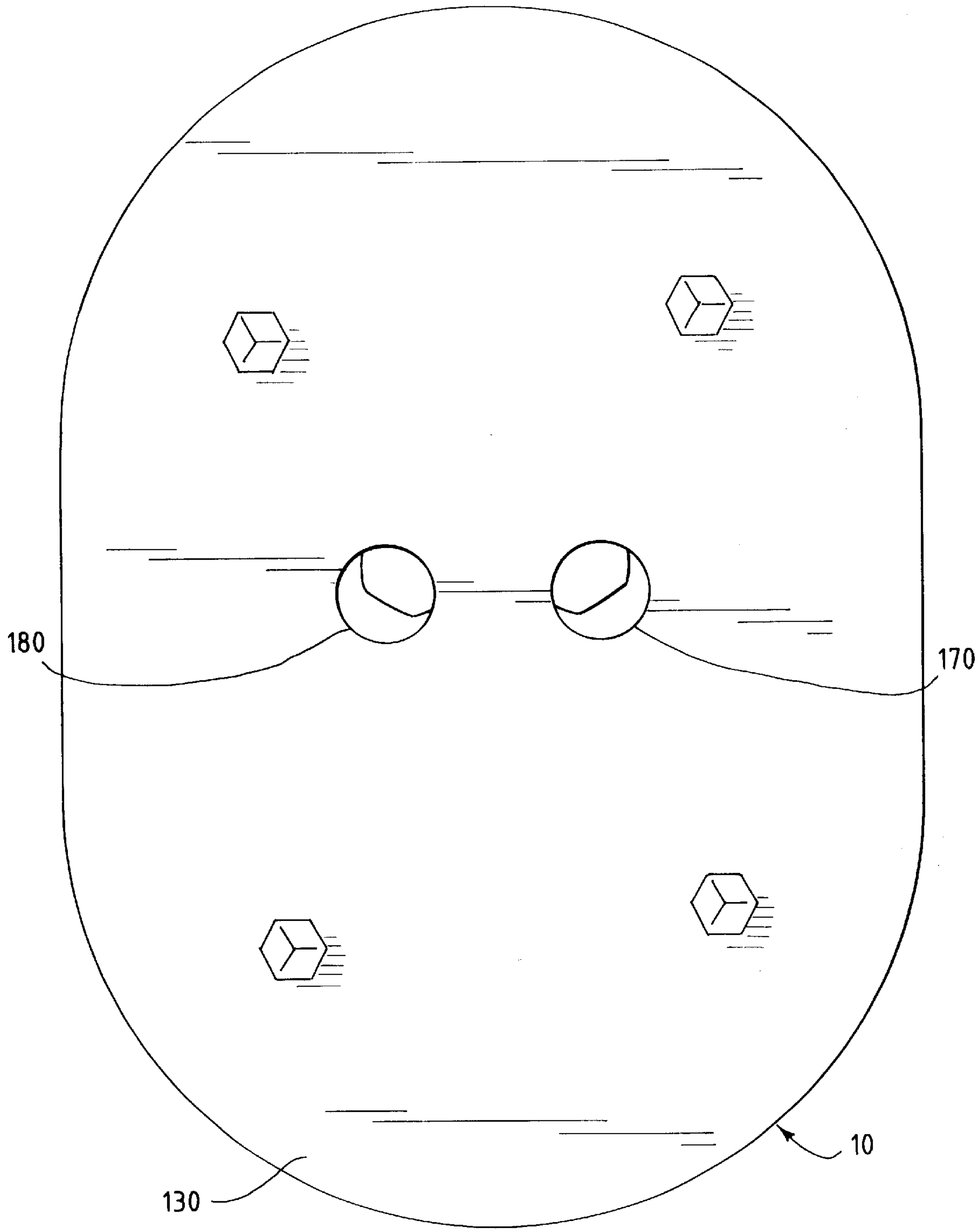
FIG. 1 is a front view of a combined pump/motor with two rotors in accordance with the principles of the present invention.
Figure 2:
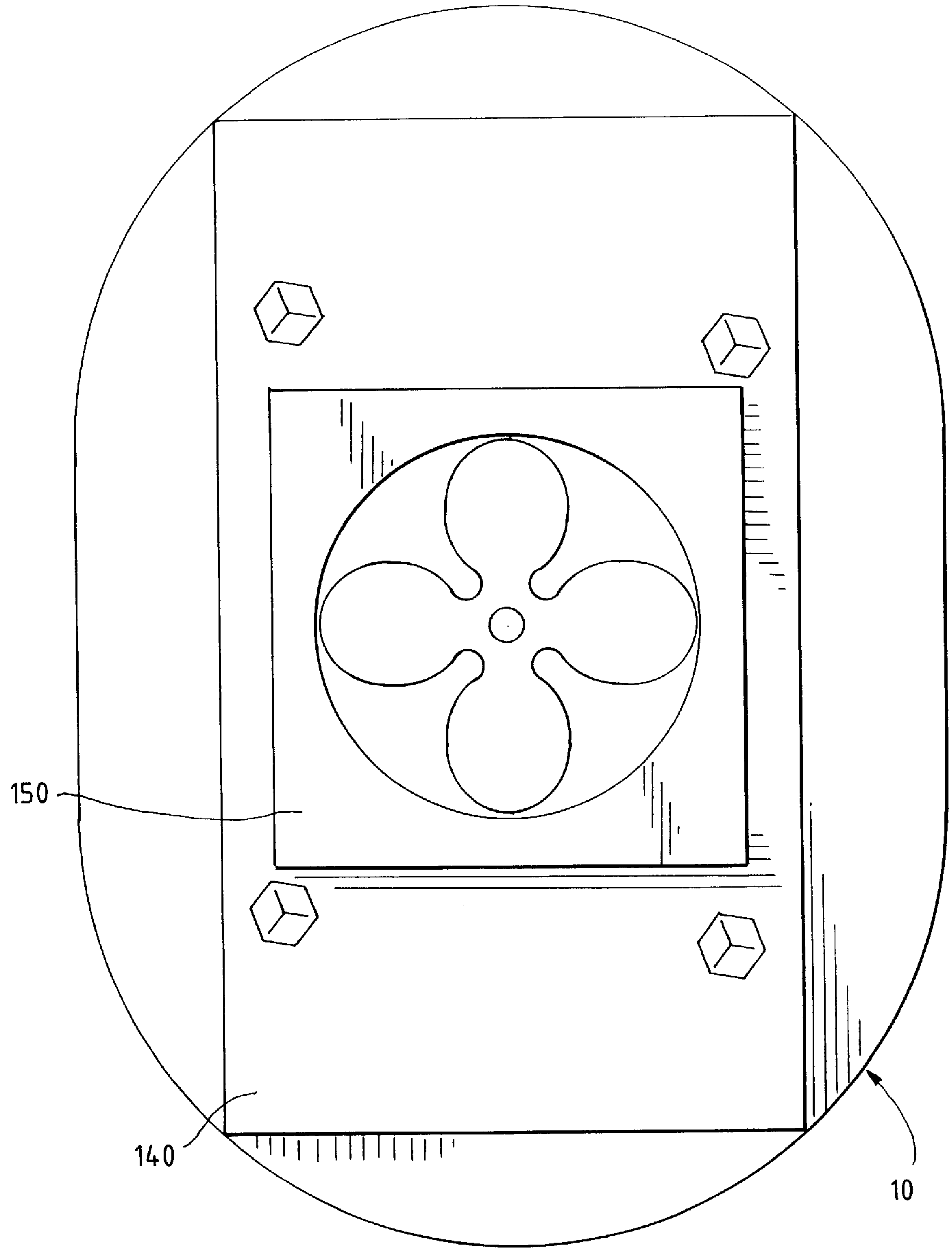
FIG. 2 is a rear view of a combined pump/motor with two rotors in accordance with the principles of the present invention.
Figure 7:
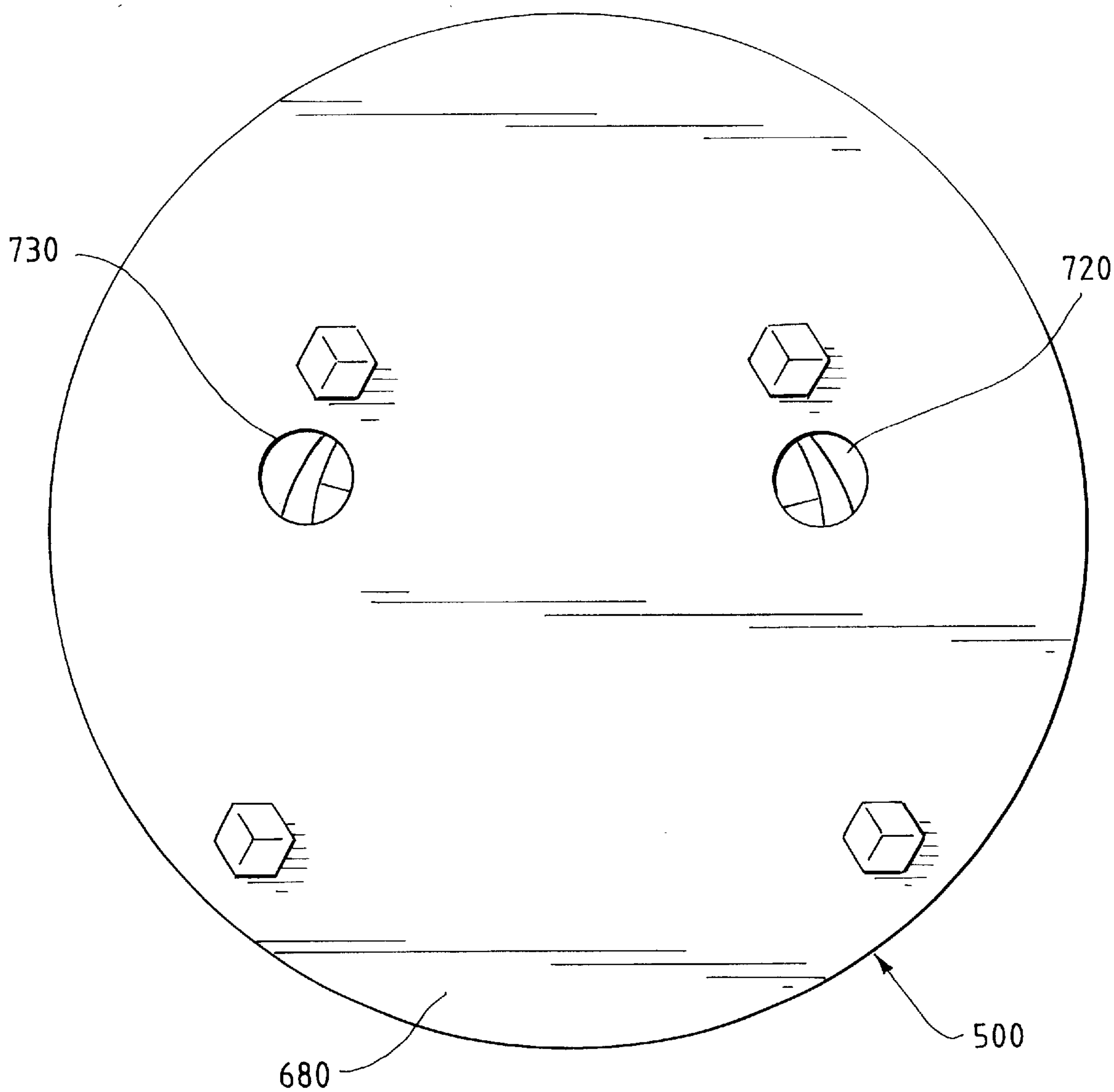
FIG. 7 is a front view of a combined pump/motor with one rotor in accordance with the principles of the present invention.

Combined pump/motor devices 10 and 500 (FIGS. 1 and 7) are provided for pumping gas, vapor or liquid, in pressure and/or vacuum applications. The pump/motor devices are particularly useful in, but not limited to, sewage aeration, soil sparging, respiratory ventilators, medical vacuum, vacuum packaging, air conditioning, refrigeration, fuel and oil pumping, hydraulics, and vapor recovery applications.

Figure 3A:
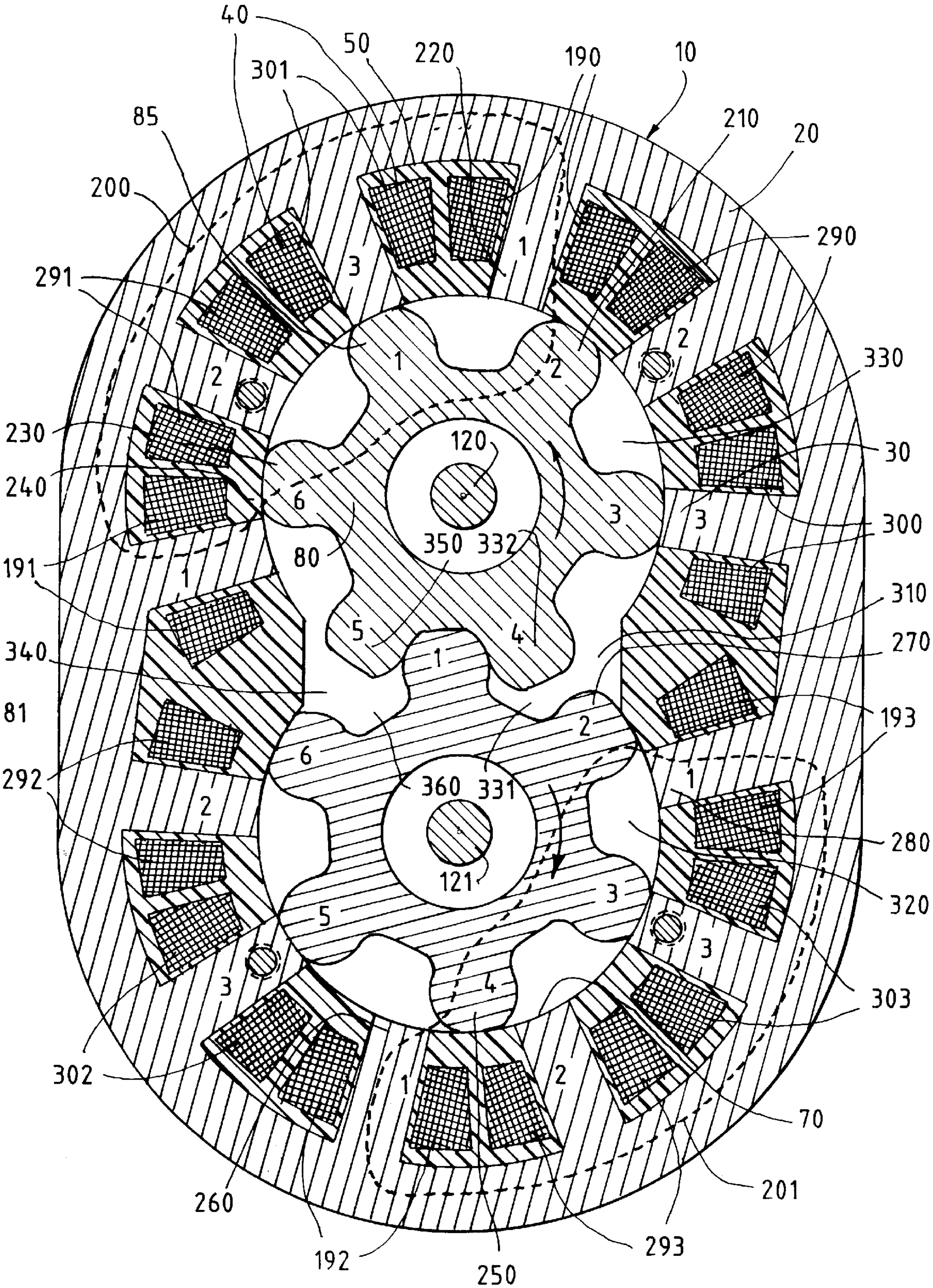
FIGS. 3A, 3B, and 3C are cross-sectional front views of a combined pump/motor with two rotors in accordance with the principles of the present invention.
Figure 4:
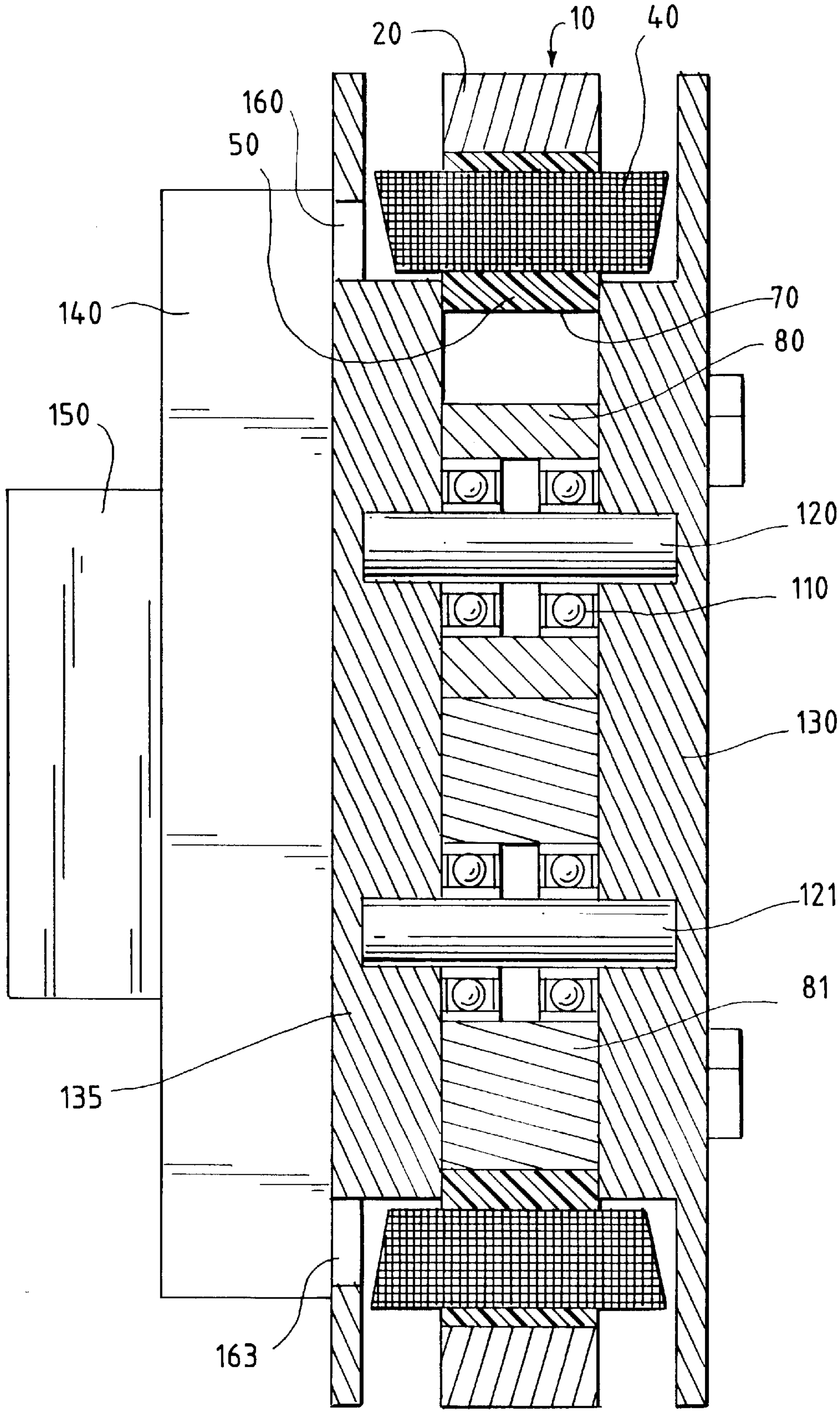
FIG. 4 is a cross-sectional side view of a combined pump/motor with two rotors in accordance with the principles of the present invention.
Figure 5:
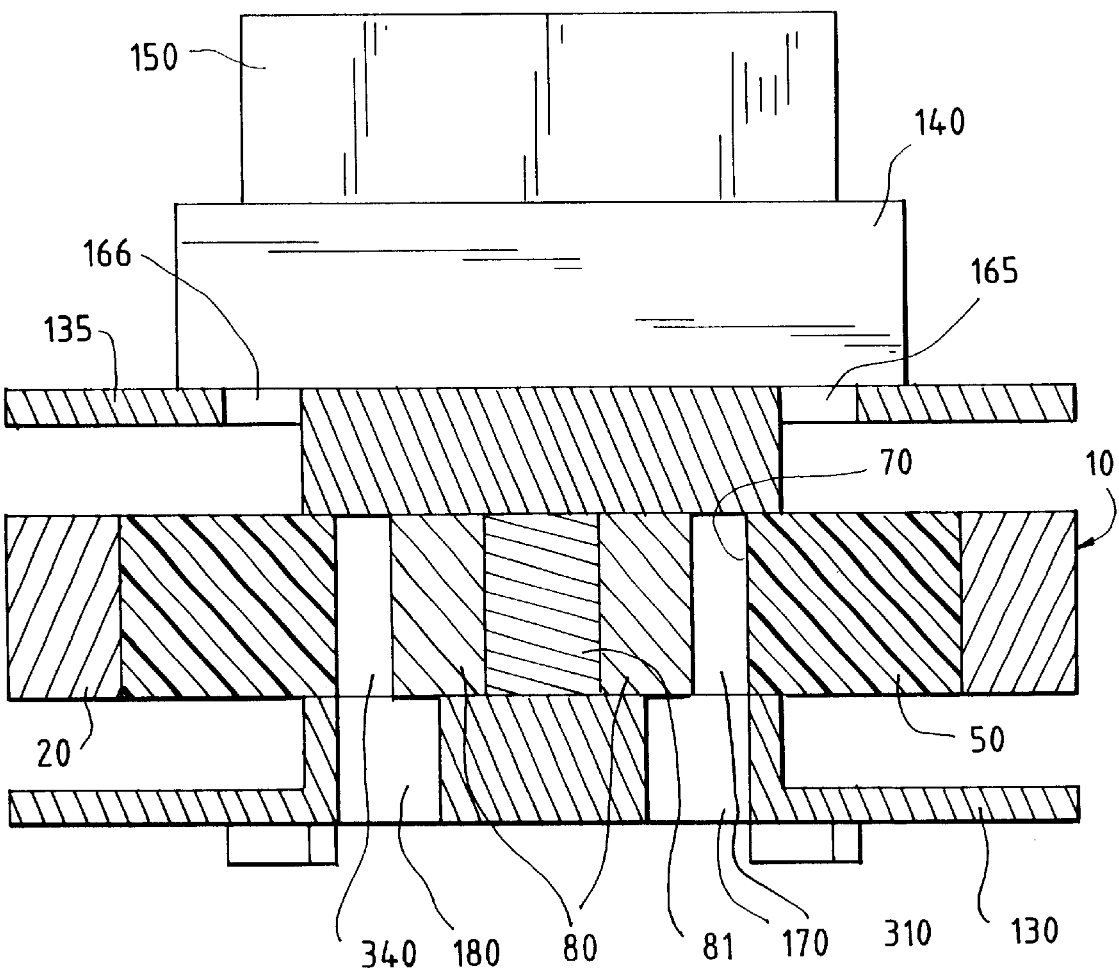
FIG. 5 is a cross-sectional top view of a combined pump/motor with two rotors in accordance with the principles of the present invention.
Figure 6:
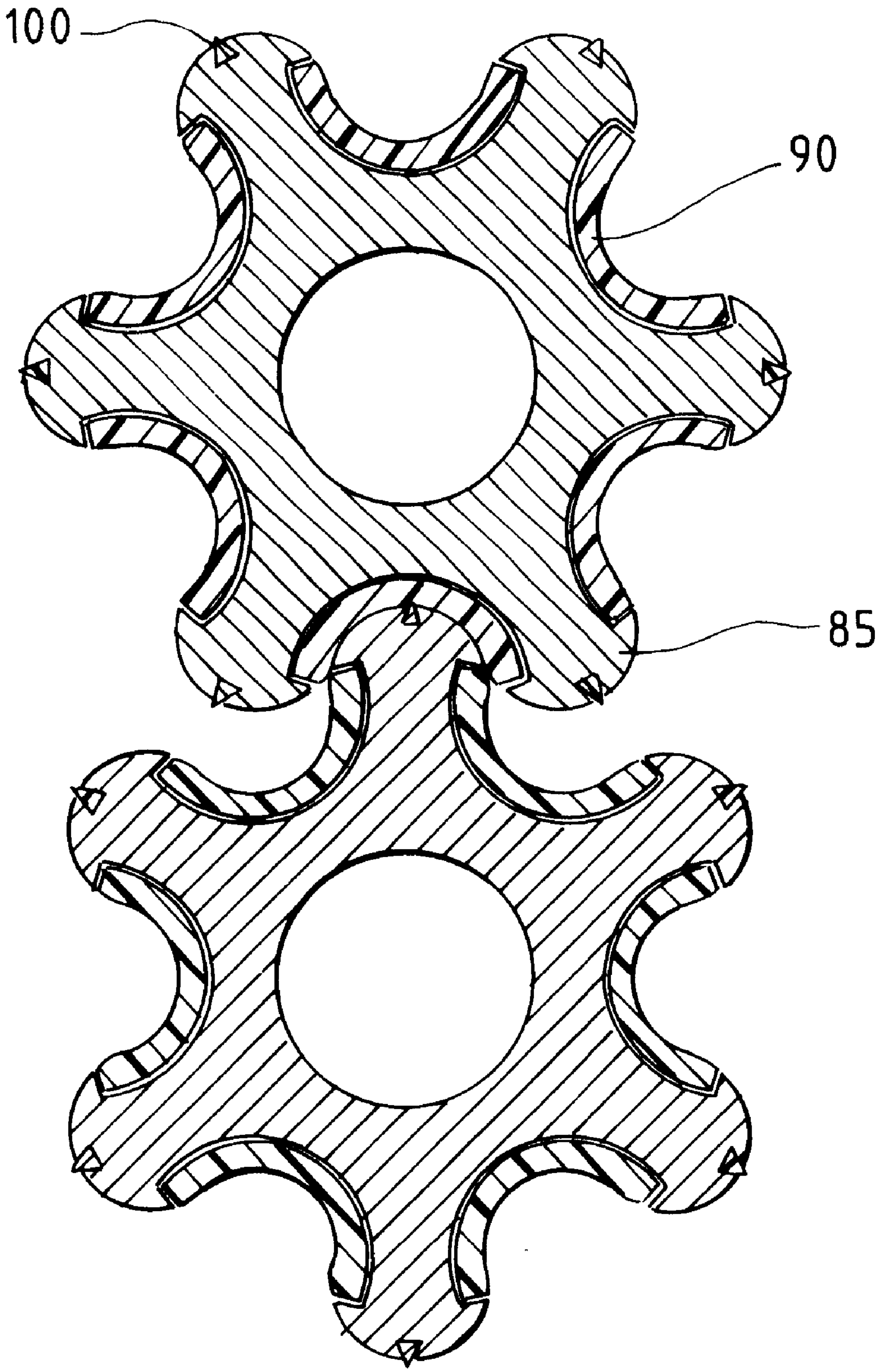
FIG. 6 is a cross-sectional front view of alternate rotors for use in a combined pump/motor with two rotors in accordance with the principles of the present invention.

The pump/motor 10 (FIGS. 1, 2, 3A, 4, and 5) is similar in form to a gear pump and has a compact one piece stator 20 (FIG. 3A, 4 and5) which is formed of iron or stacked iron laminations, can be coated or plated with a corrosion resistant material, and includes salient stator poles 30 (FIG. 3A) which face inward. This compact one piece stator design provides for lower cost construction and reduced size and weight. Each stator pole is provided with an electric winding 40 (FIGS. 3A and 4). After the windings are in place a nonmagnetic material 50 (FIGS. 3A, 4, and 5) such as plastic or epoxy, is injected between the stator poles to form a continuous surface inside the stator 70 (FIG. 3A) to provide an efficient seal between the stator and the rotors 80 and 81 (FIG. 3A, 4 and 5). The inside of the stator can be coated with a friction and wear reducing material such as the nearly frictionless carbon (NFC) developed by Argonne National Laboratories to reduce wear, friction, and increase the service life. Rotors 80 and 81 which resemble gear pump rotors, are identical and are mounted inside the stator and are formed with protruding intermeshing teeth 85 (FIGS. 3A and 6), are made of iron or stacked iron laminations and are coated with a friction reducing material such as NFC. The rotors can be coated or plated with a corrosion resistant material prior to the application of the NFC. Additionally or alternately low friction inserts 90 (FIG. 6) and/or wear/sealing strips 100 may be used which are made of Teflon (or other low friction materials).

The gear pump design provides for a constant displacement per revolution per inch of rotor length which facilitates efficient designs with shorter rotors, which allows for manufacturing efficiencies, increased rotor stiffness and strength which allows longer rotor designs that provide manufacturing efficiencies, an intake and exhaust passage which can be placed and included in the same endplate as described below to provide a compact design with good manufacturing efficiency, increased pressure capability, mechanically self synchronizing rotors, a labyrinth style seal between the rotor and the stator for increased pumping efficiency, identical rotors which have equal torque requirements and equal flux capacity, which when used with the stator pole, winding and wiring arrangement described below, provide inherent magnetic synchronization without individual control of each rotor and without readjustment of that control because of changing loads. Excellent high speed performance is also attained which allows for a further reduction in size by employing a smaller pump design at a higher speed while producing similar output. The gear pump design further provides for a reduction in cost of manufacture of the rotors and the stator being that the rotor teeth and the stator poles can be arranged in a straight or non-helical manner which provides for ease, efficiency and lower cost of manufacture. Significantly higher torque is also attained by providing magnetic attraction of the rotor teeth described below which is mainly radial in direction and has little or no axially directed components of the magnetic attraction.

The rotors 80 and 81 (FIG. 3A and 4) are fitted with roller bearings 110 (FIG. 4) and mounted on stationary shafts 120 and 121 (FIGS. 3A and 4) which provides for a compact design by moving the bearings into the rotor. Alternately the rotors can be fitted with sleeve bearings to allow the use of an increased diameter shaft to provide a design of increased strength. The shaft and the interior of the sleeve bearings can be coated with NFC to provide low friction and long life. The stationary shafts are held in place by and mounted into the endplates 130 and 135 (FIGS. 4 and 5). The end plates are made of a nonmagnetic material, such as aluminum or plastic to avert short circuiting the magnetic flux paths described below and also to reduce the weight of the unit. The interior surfaces of the endplates can be coated with a friction reducing material such as NFC to reduce wear in that area.

Figure 3B:
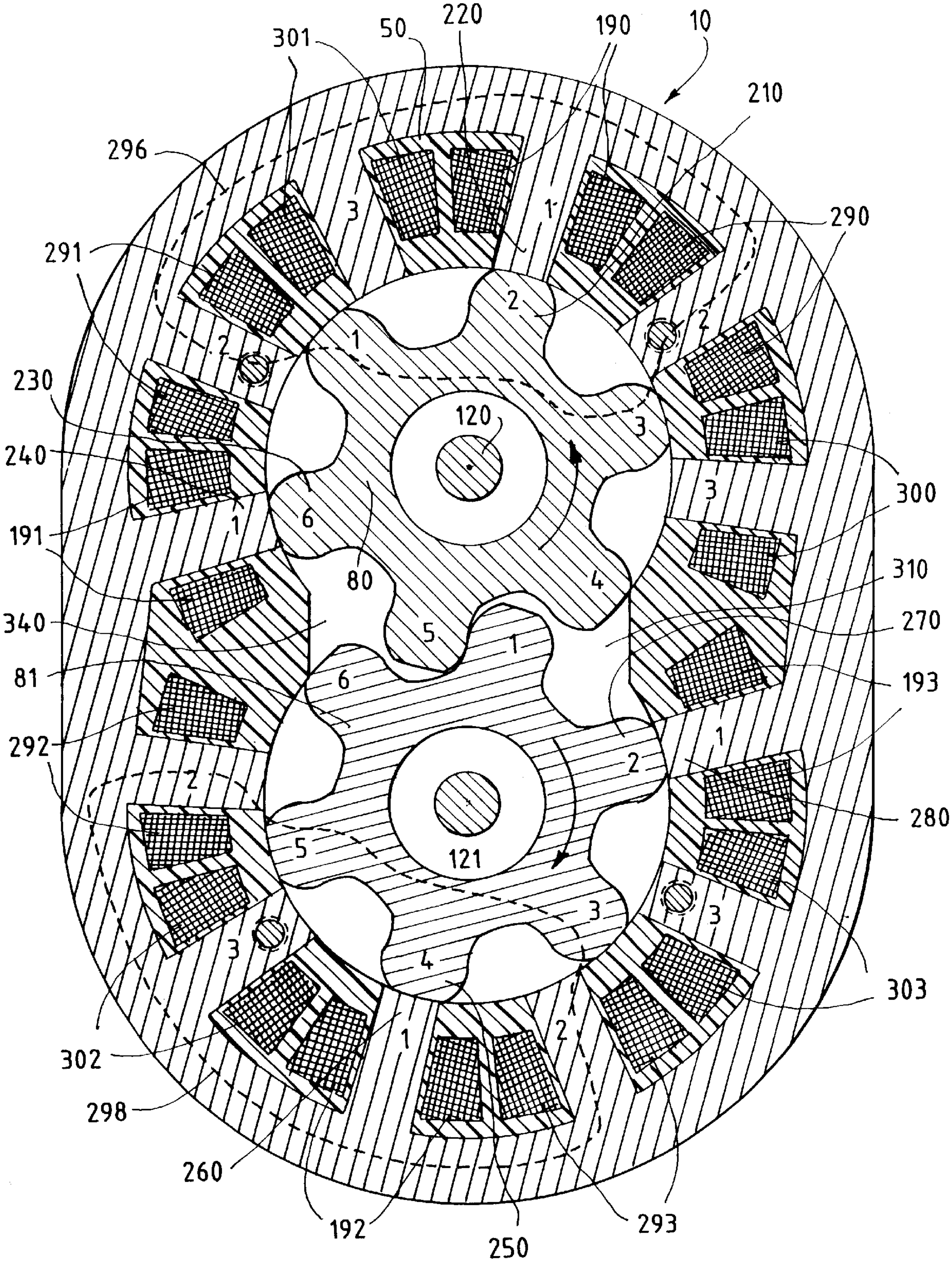
Figure 3C:
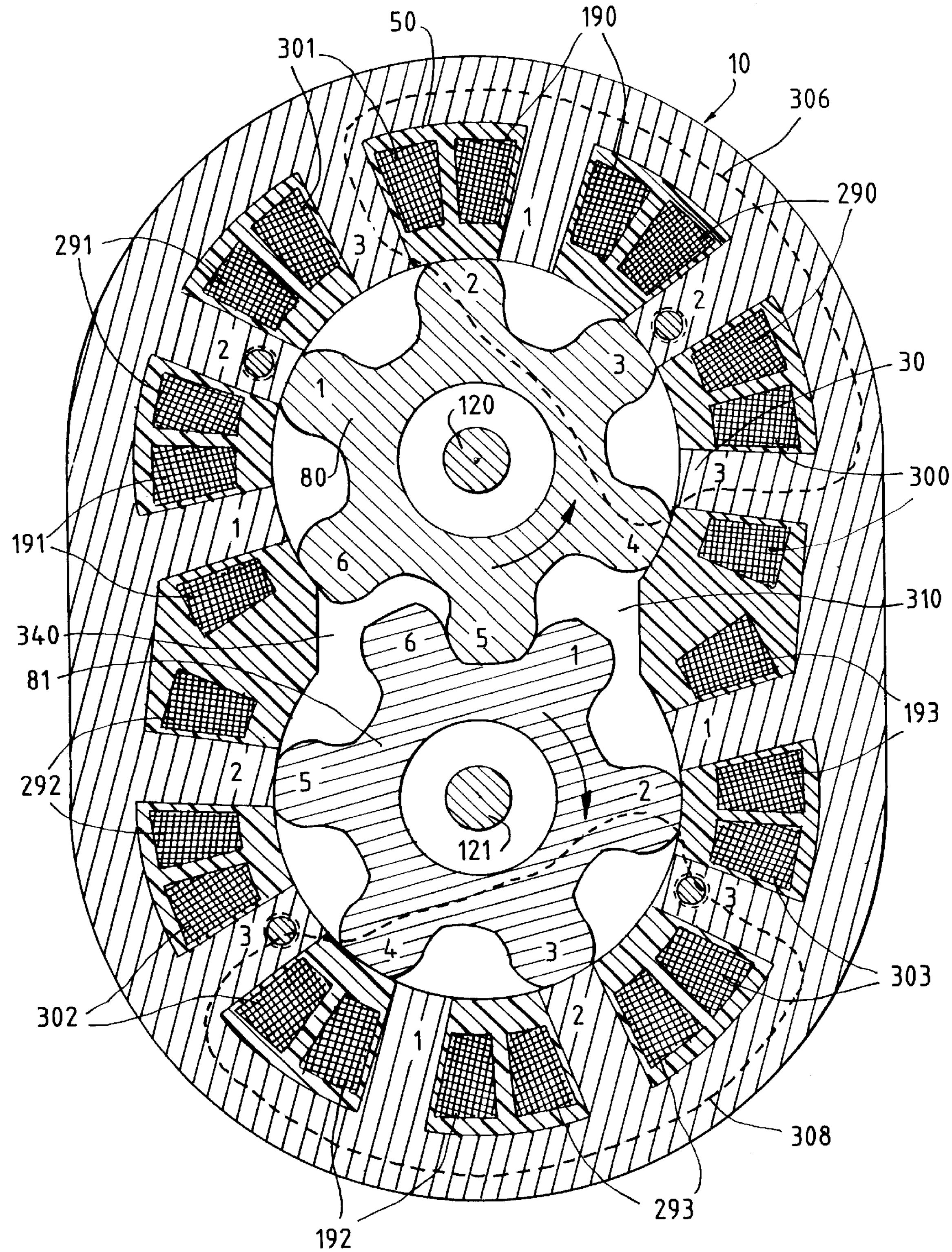
Figure 12:
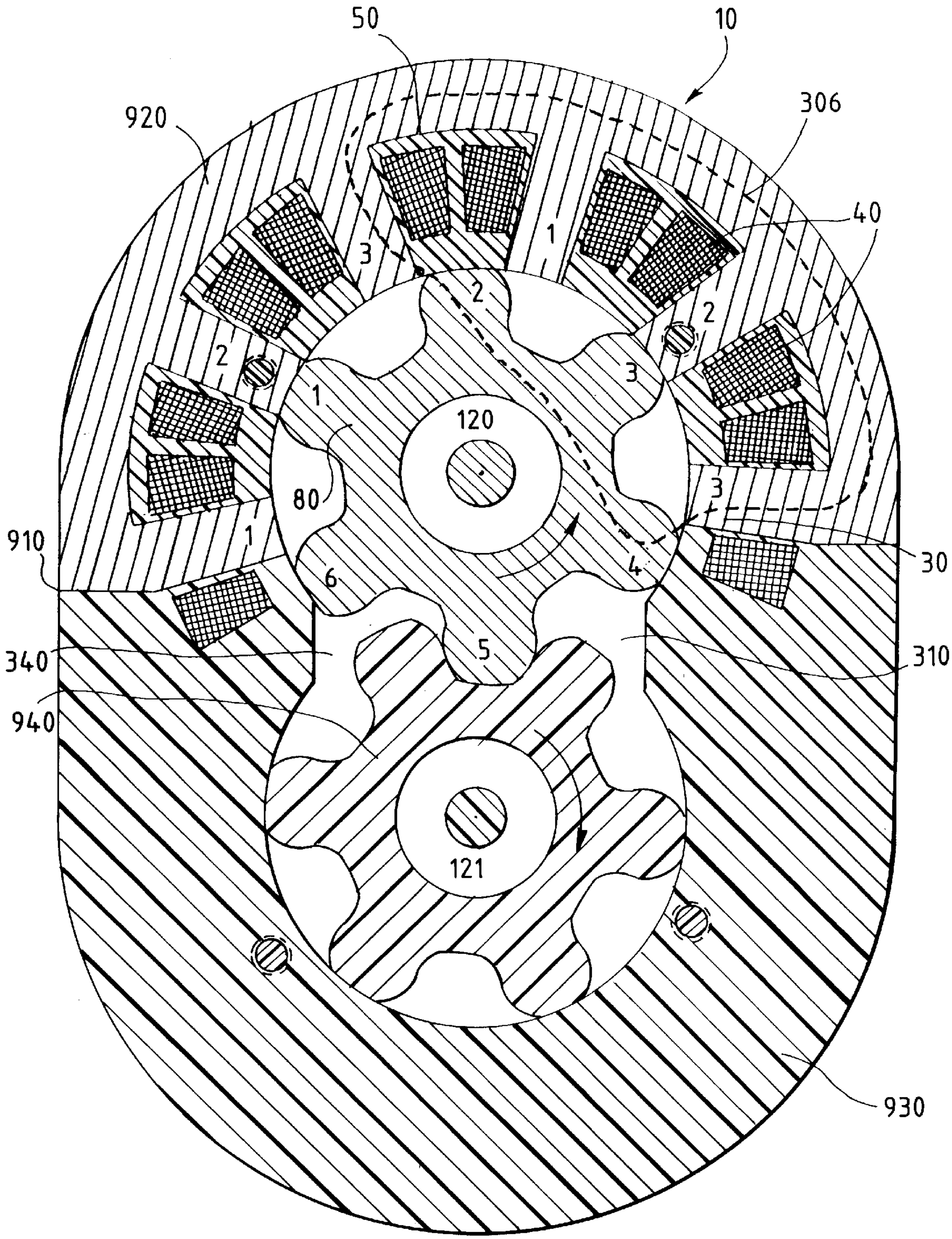
FIG. 12 shows a cross-sectional front view of another embodiment of a combined pump/motor with two rotors.

The stator poles of each side are oriented identically (except for considerations of rotation) in relation to the rotor teeth 85 (FIG. 3A) of their respective rotors 80 and 81 and the corresponding phase windings 40 from each side are wired and operated together to provide magnetic synchronization. Alternately, as shown in FIG. 12 for applications where lower input/output is suitable, stator poles 30 (FIG. 12) and windings 40 can be placed in one side of the stator 910 around one rotor 80 and in this way take advantage of the gear type design in which the rotors 80 and 940 are mechanically self synchronizing, i.e. one rotor 80 is magnetically driven and rotation is imparted to the other rotor 940 by the driven rotor 80. For further reductions in the cost of manufacture and weight of this design, the stator 910 can be made of magnetic and nonmagnetic materials such that the portion 920 of the stator which includes the stator poles 30 is made of a magnetic material and the remainder 930 of the stator is made of a nonmagnetic material such as plastic. Additionally the rotors are not necessarily identical. The rotor 940 opposite the magnetically driven rotor 80 can be made of a nonmagnetic material such as plastic and have a different number of teeth than the driven rotor 80. The stator pole and winding arrangements described above greatly simplify the control requirements by providing the ability to be controlled by a single electronic computer controller 140 (FIGS. 2, 4, and 5) in a manner similar to that used to control a single motor with a single rotor while maintaining synchronization. This reduces the number of electronic switching devices and controls necessary for efficient and synchronized operation thereby reducing the manufacturing cost. For highest input/output in this device both rotors 80 and 81 (FIG. 3A) are driven by simultaneous, and identical (except for rotation) pairs of magnetic fields 200 and 201 (FIG. 3A), 296 and 298 (FIG. 3B), and 306 and 308 (FIG. 3C). This also provides for a longer life by reducing the wear and friction between the rotors as mechanical synchronization is utilized only during starting, stopping, fault or power failure. The electronic computer controller 140 (FIGS. 2,4 and 5) can be integral with the pump/motor or alternately it can be remotely mounted. A cooling fan 150 can be integral with the controller and/or the pump/motor to cause air flow through the controller and/or through passages 160 and 163 (FIG. 4) and 165 and 166 (FIG. 5) in the endplate 135 (FIG. 4 and 5) and over the stator and the windings to remove heat from the unit. An intake passage 170 (FIGS. 1 and 5) and an exhaust passage 180 are included in the endplate 130. In operation the electronic computer controller 140 is programmed to sense the position of the rotor teeth 85 (FIG. 3A) through the use of the windings and/or position sensors. The controller then calculates and applies the optimum amount of current, in the optimum waveform and frequency to the correct windings at the optimum time for the optimum amount of time in order to provide a smooth and efficient rotation of the rotors in the desired direction and at the desired speed. The flow of current through the windings causes a magnetic field or flux to develop in the stator poles 30 which attracts the rotor teeth 85 to complete a magnetic circuit. In this way the stator 20 functions as a switched reluctance motor stator and the rotors 80 and 81 function as switched reluctance motor rotors in a sequence which is as follows. The windings 190 and 192 (FIG. 3A) are energized (forward polarity) simultaneously with windings 191 and 193 (reverse polarity). This causes a simultaneous flow of magnetic flux to flow along paths 200 and 201. This flow of flux simultaneously causes rotor tooth 210 to be attracted to and line up with the stator pole 220, rotor tooth 230 to be attracted to and line up with stator pole 240, rotor tooth 250 to be attracted to and line up with stator pole 260 and rotor tooth 270 to be attracted to and line up with stator pole 280.

As the rotor teeth and stator poles line up, windings 190, 191, 192 and 193 (FIG. 3B) are de-energized and windings 290 and 292 are energized (forward polarity) simultaneously with windings 291 and 293 (reverse polarity). This causes a simultaneous flow of magnetic flux to flow along paths 296 and 298. As the respective rotor teeth and stator poles line up windings 290, 291, 292 and 293 (FIG. 3C) are de-energized and windings 300 and 302 are energized (forward polarity) simultaneously with windings 301 and 303 (reverse polarity). This causes a simultaneous flow of magnetic flux to flow along paths 306 and 308. As the respective rotor teeth and stator poles line up, windings 300, 301, 302 and 303 (FIG. 3A) are de-energized and windings 190, 191, 192 and 193 are again energized as previously described to continue rotation. This process is repeated continuously to cause continuous rotation. The flow of magnetic flux along the flux path 200 is as follows. The flux leaves the stator pole 220 and enters rotor tooth 210 where it continues through the rotor 80 and leaves through rotor tooth 230 and enters stator pole 240 and travels back through the stator 20 to stator pole 220. This makes a complete magnetic circuit and each phase of operation of each side uses a similar path. The flow of flux can be in either direction. This type of flux path facilitates the use of the compact one piece stator by eliminating the need for an additional outer housing to complete the flux path. In this illustration the magnetic fields (flux paths) around rotor 80 move clockwise, and rotor 80 turns counterclockwise. The magnetic fields (flux paths) around rotor 81 move counterclockwise, and rotor 81 turns clockwise in a three phase arrangement in which there are six rotor teeth on each rotor evenly spaced sixty degrees apart and six stator poles evenly spaced forty degrees apart in a two hundred forty degree circumferential portion of the stator around each rotor. This particular switched reluctance motor design used on each side may be described as a 9/6 design (9 stator poles/6 rotor teeth) which has one third of the stator and poles removed. This type of partial stator design provides for high efficiency, increased torque, increased horsepower, and high power density, by imparting rotation to the rotors in eighteen separate twenty degree steps with each step contributing equal amounts of torque and doing so in a three phase operation with each step a complete, efficient and torque producing magnetic circuit. This also provides a reduction in cost of manufacture by reducing the number of electronic switching devices and phases necessary for efficient operation. Other partial stator arrangements with a different number of phases, stator poles, rotor teeth and different amounts of stator section which include the stator poles are possible such as a 12/9 (four phase) or 18/12 (three phase) design with one third of the stator and poles removed which could be used for lower flow, higher pressure requirements by allowing decreased displacement per revolution of the rotor design by increasing the number of rotor teeth, and increasing the number of sealing segments in the labyrinth sealing arrangement while maintaining torque. Fractional combinations are also possible such as 10 1/2/7 with nine twenty firsts of the theoretical stator and poles removed leaving six stator poles in a three phase operation. Windings 190,191,192 and 193 (FIG. 3A) are wired together and operated as the first phase windings; windings 290, 291, 292 and 293 (FIG. 3B) are wired together and operated as the second phase windings; and windings 300, 301, 302 and 303 (FIG. 3C) are wired together and operated as the third phase windings. Each flux path used by the present invention is substantially shorter and has low reluctance, employs two stator windings to drive the flux both of which are energized simultaneously, and imparts torque to two rotor teeth on its respective rotor thus increasing the efficiency and power of the unit. This flux path is effective in producing high torque per inch of rotor length with high efficiency and its effectiveness and efficiency is not diminished by increased or long rotor lengths, and when combined with the gear pump design, its effectiveness and efficiency is not diminished by decreased or short rotor lengths thus eliminating these design restrictions. This flux path also facilitates the utilization of the switched reluctance motor designs previously described.

As the rotors rotate the pumped medium is carried from the low pressure area of the pump 310 (FIG. 3A and 5) by the cavities or pockets 320 and 330 (FIG. 3A) which are formed between the rotor and the stator, to the high pressure area of the pump 340. In this way the stator also functions as a gear pump stator and the rotors also function as gear pump rotors. Negative pressure or vacuum is caused as the rotor tooth 332 is moved out of rotor cavity 334 thus drawing the pumped medium through the intake passage 170 (FIGS. 1 and 5) and into the pump. The pumped medium is carried to the high pressure area of the pump 340 (FIGS. 3A and 5) where it is forced out and through the exhaust passage 180 (FIGS. 1 and 5) as the rotor tooth 350 (FIG. 3A) occupies the rotor cavity 360.

The electronic computer controller can be configured to maintain (up to design limits) flow regardless of pressure and/or pressure regardless of flow. The computer controller can accomplish this by continually monitoring the speed and the load through feedback from the windings and/or other sensors, and adjusting the electrical input to maintain the desired output pressure and/or flow of the unit thus eliminating the need for mechanical regulators, and over pumping thereby increasing efficiency and decreasing electrical consumption by pumping only at the rate necessary to maintain the desired output. It can also be used in conjunction with a demand sensing circuit to control and/or vary output as needed. Noise reduction can be accomplished by mounting audio transducers in the intake and exhaust ports adjacent to the endplate (or other advantageous areas) which are operated and controlled by the electronic computer controller to produce an audio signal which is equal in frequency, waveform, and amplitude, but opposite in phase to the sound emitted from the pump/motor, thus canceling out much of the noise emitted from the unit. This arrangement provides for less weight, smaller size and lower manufacturing cost by reducing or eliminating the need for conventional mufflers, sound insulation and/or a sound attenuating containment.

Figure 8:
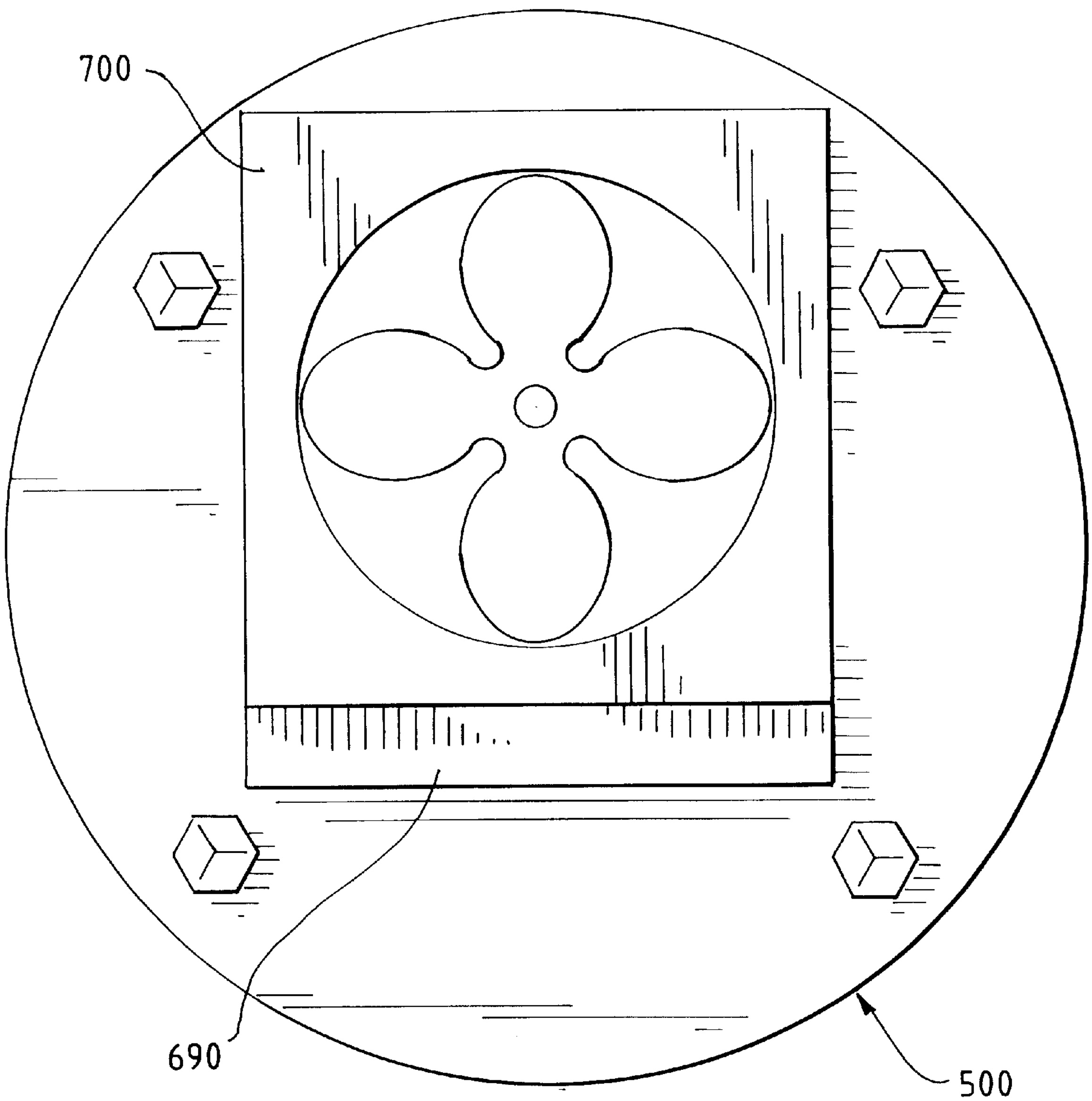
FIG. 8 is a rear view of a combined pump/motor with one rotor in accordance with the principles of the present invention.
Figure 9A:
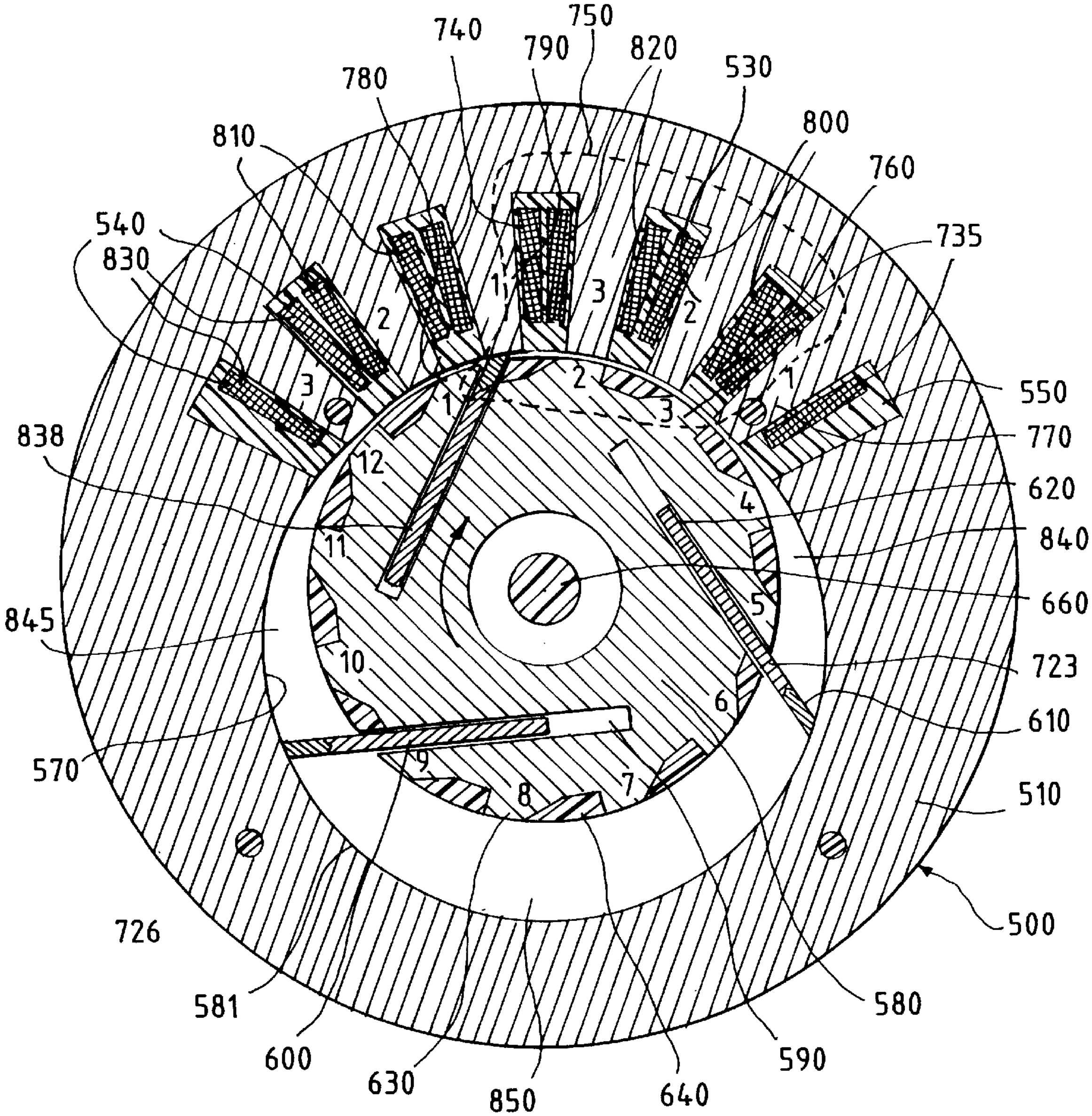
FIGS. 9A, 9B, and 9C are cross-sectional front views of a combined pump/motor with one rotor in accordance with the principles of the present invention.
Figure 9B:
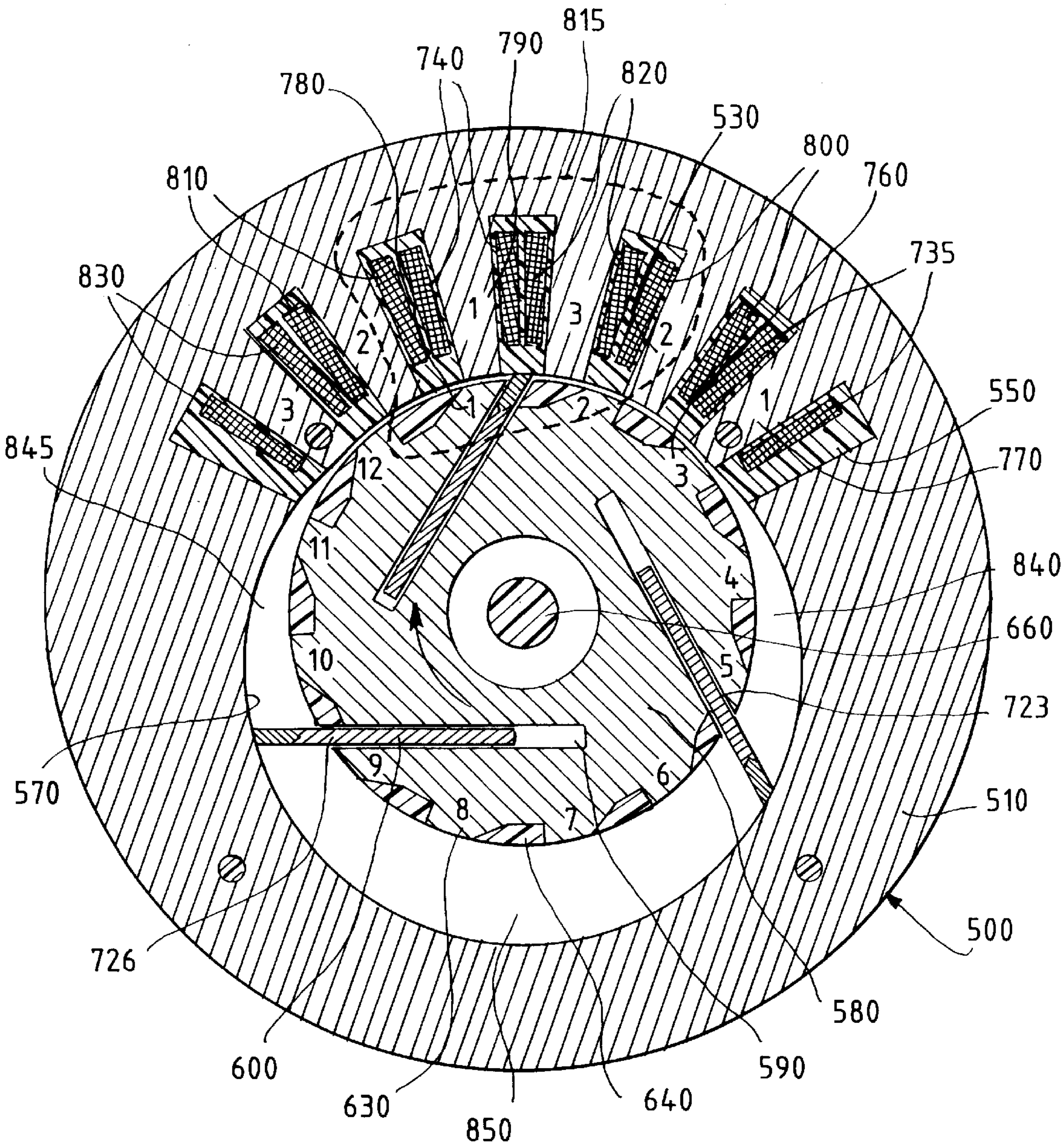
Figure 9C:
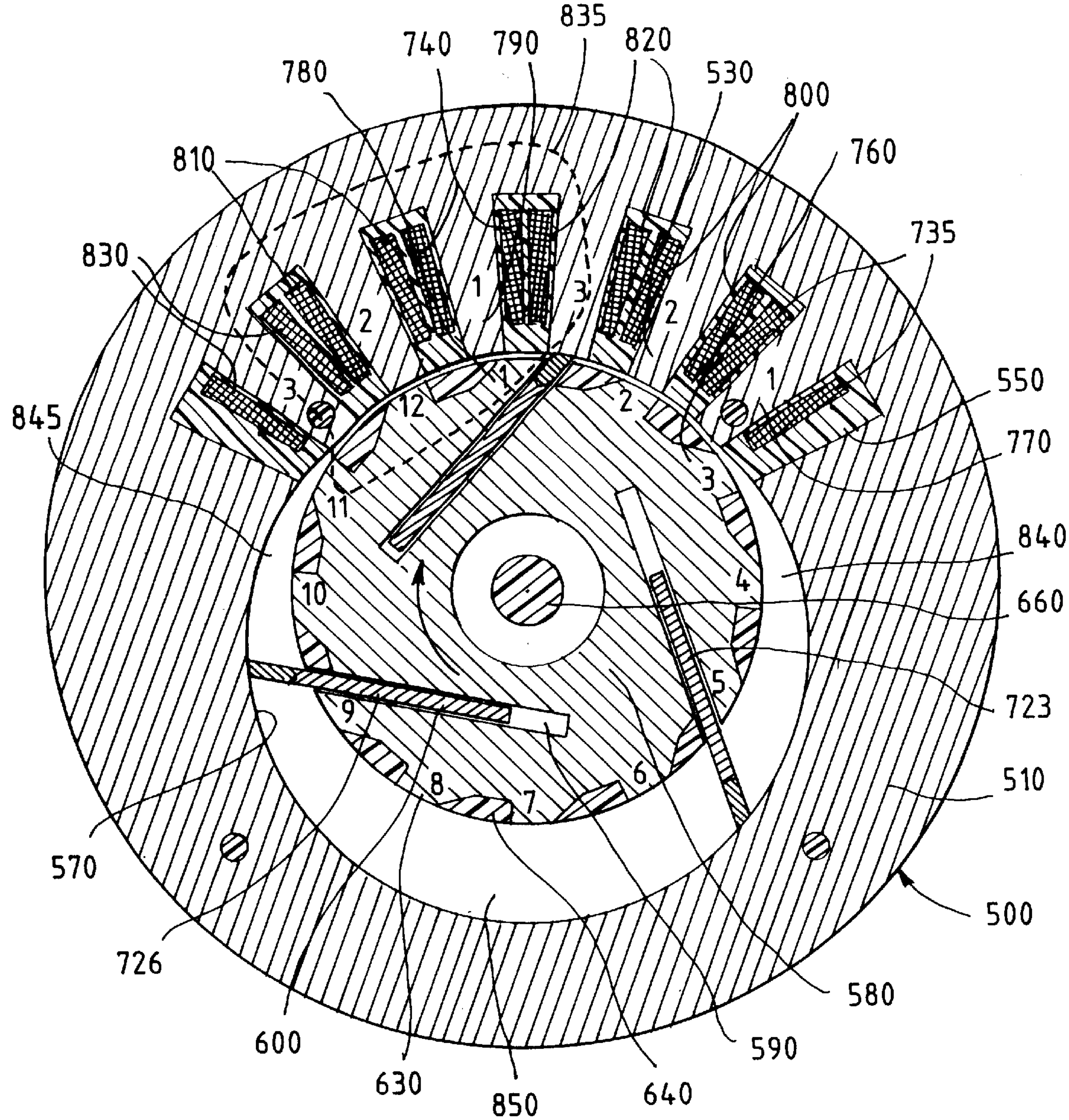
Figure 10:
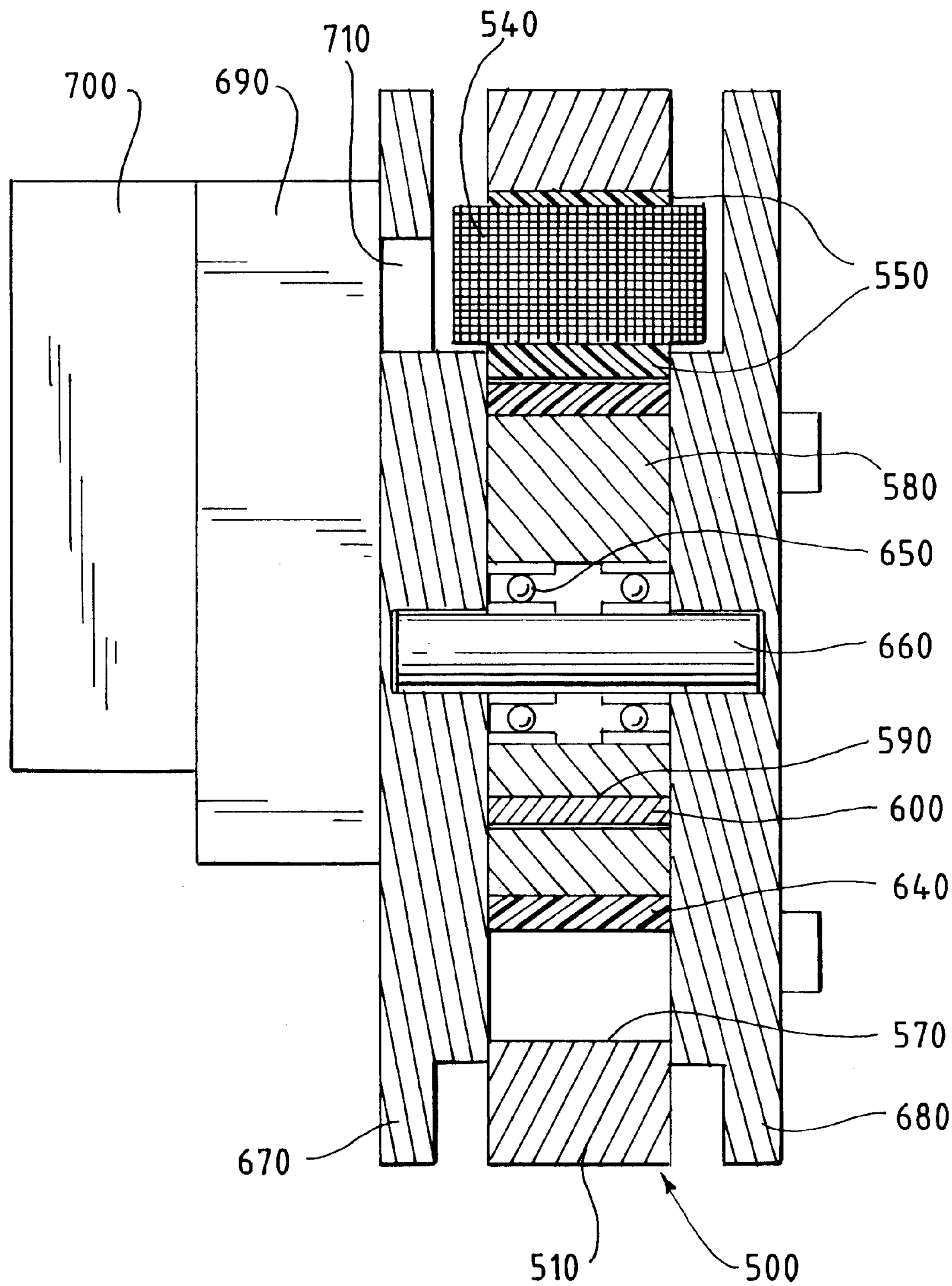
FIG. 10 is a cross-sectional side view of a combined pump/motor with one rotor in accordance with the principles of the present invention.
Figure 11:
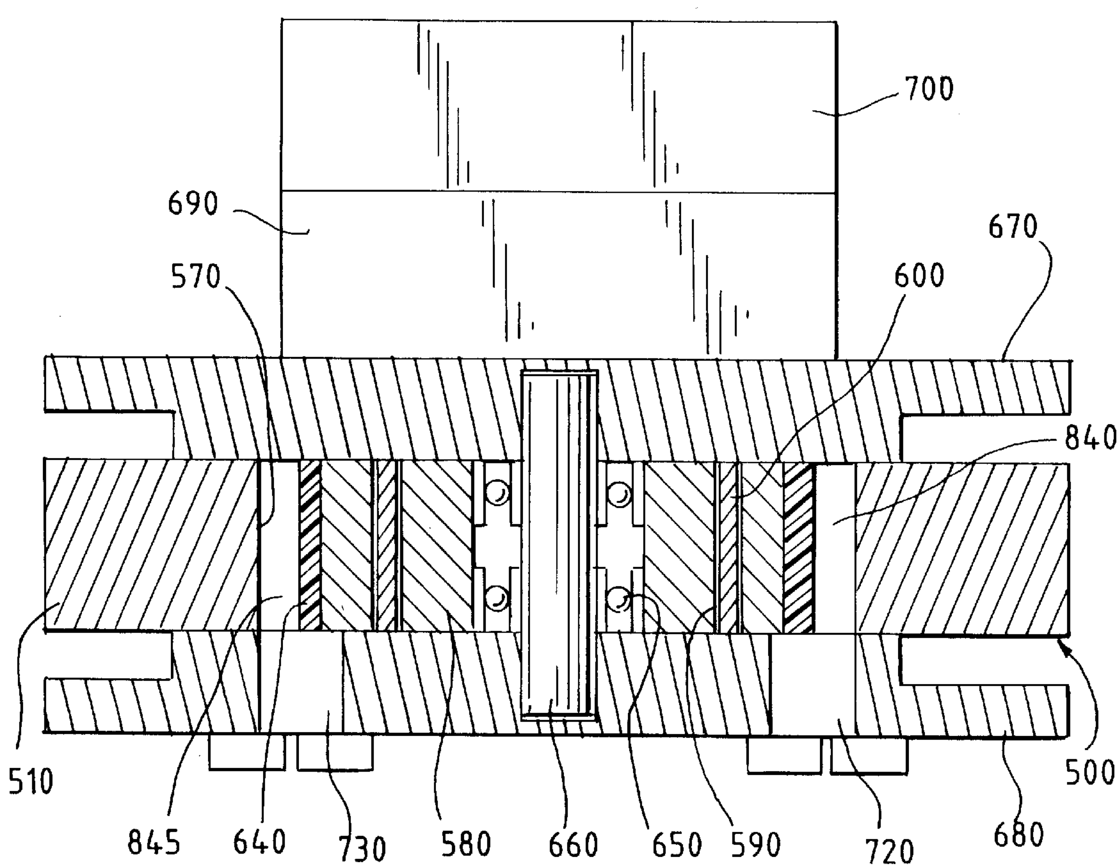
FIG. 11 is a cross-sectional top view of a combined pump/motor with one rotor in accordance with the principles of the present invention.
Figure 13:
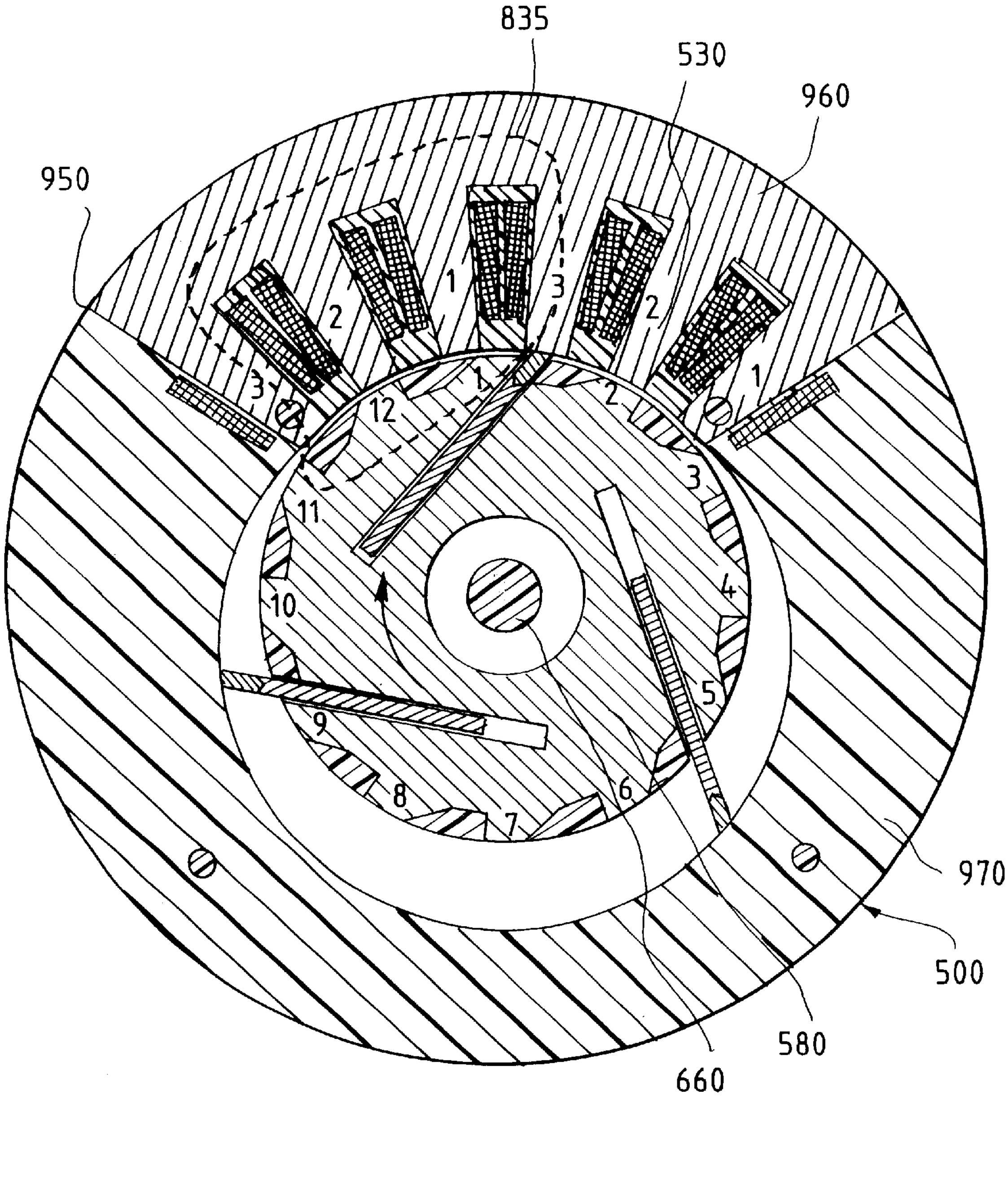
FIG. 13 shows a cross-sectional front view of another embodiment of a combined pump/motor with one rotor.

The pump/motor 500 (FIGS. 7, 8, 9A, 10 and 11) is similar in form to a rotary vane pump and has a compact one piece stator 510 (FIGS. 9A, 10 and 11) which is formed of iron or iron laminations, can be coated or plated with a corrosion resistant material, and includes salient stator poles 530 (FIG. 9A) on a portion of the internal circumference which face inward. Each stator pole is provided with an electric winding 540 (FIGS. 9A and 10). After the windings are in place a nonmagnetic material 550 such as plastic or epoxy is injected between the stator poles to form a continuous surface 570 (FIGS. 9A, 10 and 11) inside the stator to provide an efficient seal between the rotor and the stator. The inside of the stator is coated with a friction reducing material such as NFC to create an even wearing and slippery surface, and has an eccentric shape 581 (FIG. 9A) with the circumferential portion of the stator which includes the stator poles 530 having the same radius as the rotor 580 and the remainder or pumping portion of the stator having a somewhat larger radius than the rotor. This compact one piece stator design provides for lower cost of manufacture and reduced size and weight. As shown in FIG. 13 additional cost and weight reductions can be provided by fabricating the stator 950 (FIG. 13) from magnetic and nonmagnetic material such that the portion 960 of the stator which includes the stator poles 530 is made of a magnetic material and the remainder or pumping portion 970 of the stator can be made of a nonmagnetic material such as plastic. This would also provide significant manufacturing efficiencies. The rotor 580 (FIG. 9A), which somewhat resembles a rotary vane pump rotor, is made of iron or stacked iron laminations, can be coated or plated with a corrosion resistant material and is mounted inside the stator and has slots 590 cut into it to accommodate the vanes 600. The vanes can be made of carbon or another non-magnetic material or alternately they can be made partly of a nonmagnetic material beginning from the leading end 610 (FIG. 9A) of the vane and continuing for up to 50% of its length with the remainder of its length continuing on to the trailing end 620 being made of a magnetic material such as iron, in order to decrease the magnetic reluctance which is present in the slots of the rotor thereby increasing the efficiency and power of the pump/motor. The vanes can be coated with a friction reducing material such as NFC to reduce wear of the vanes 600 and rotor slots 590. The rotor is also formed with poles 630 around its circumference for driving the rotor magnetically or alternately it can have permanent magnets embedded in its circumference which would allow the rotor to operate as a brushless permanent magnet motor rotor. The areas 640 (FIGS. 9A, 10 and 11) between the poles are filled with a non-magnetic material such as plastic or epoxy to provide more efficient pump operation. The rotor is fitted with roller bearings 650 (FIGS. 10 and 11) and is mounted on a stationary shaft 660 (FIGS. 9A, 10 and 11). Alternately the rotor can be fitted with sleeve bearings to allow the use of an increased diameter shaft to provide a design of increased strength. The shaft and the interior of the sleeve bearings can be coated with NFC to provide low friction and long life. The shaft is held in place by and is mounted into the endplates 670 and 680 (FIGS. 10 and 11). The endplates are made of a non-magnetic material such as aluminum or plastic to avert short circuiting the magnetic flux paths described below and also to reduce weight of the unit. The endplates interior surfaces can be coated with a friction reducing material such as NFC to reduce friction and wear. The present single rotor rotary vane design greatly simplifies the control requirements by eliminating one rotor completely and also provides for an even more compact and lighter pump/motor unit by providing a high displacement per revolution. The rotary vane pump design also provides for a constant displacement per revolution per inch of rotor length which facilitates efficient designs with shorter rotors which in turn allows manufacturing efficiencies. This embodiment also provides for an increased rotor stiffness and strength which allows longer rotor designs which in turn allows some manufacturing efficiencies; increased pressure capability; an intake and exhaust passage which can be placed and included in the same endplate as described below to provide a compact design with good manufacturing efficiency; an efficient contact sealing arrangement which provides excellent low speed efficiency; and, a displacement per revolution which is easily changed without affecting the stator pole design, rotor design or the flux path described below by changing the radius of the pumping portion of the stator which allows for manufacturing efficiencies. The rotary vane pump design further provides for a reduction in cost of manufacture of the rotor and the stator being that the rotor poles and the stator poles can be arranged in a straight or non-helical manner which allows for ease, efficiency and lower cost of manufacture. Significantly higher torque is also attained by providing magnetic attraction of the rotor teeth described below which is mainly radial in direction and has little or no axially directed components of the magnetic attraction. This rotary vane pump design also provides a stronger and more compact rotor mounting by moving the bearings into the rotor which allows for higher pressure capabilities and longer rotor designs for increased manufacturing efficiencies. An electronic computer controller 690 (FIGS. 8, 10 and 11) can be integral with the pump/motor or alternately it can be remotely mounted. A cooling fan 700 can be integral with the controller and/or the pump/motor to cause airflow through the controller and/or through passages 710 (FIG. 10) in the endplate 670 and over the stator and the windings to remove heat from the unit. A pump intake passage 720 (FIGS. 7 and 11) and a pump exhaust passage 730 are included in the endplate 680. In operation the electronic computer controller is programmed to sense the position of the rotor poles though the use of the windings and/or position sensors. The controller then calculates and applies the optimum amount of current, in the optimum waveform and frequency to the correct windings at the optimum time for the optimum amount of time in order to provide smooth and efficient rotation of the rotor in the desired direction and at the desired speed. The flow of current through the windings causes a magnetic field or flux to develop in the stator poles which attract the rotor poles to complete the magnetic circuit. In this way the stator 510 (FIG. 9A) functions as an electric switched reluctance motor stator and the rotor 580 functions as an electric switched reluctance rotor in a sequence which is as follows. The windings 735 (FIG. 9A) are energized (forward polarity) simultaneously with windings 740 (reverse polarity). This causes a magnetic flux to flow along path 750. This flow of flux simultaneously causes rotor pole 760 to be attracted to and line up with the stator pole 770 and rotor pole 780 to be attracted to and line up with stator pole 790. As the rotor poles and stator poles line up, windings 735 and 740 (FIG. 9B) are de-energized and windings 800 are energized (forward polarity) simultaneously with windings 810 (reverse polarity). This causes a magnetic flux to flow along path 815. As the respective rotor poles and stator poles line up, windings 800 and 810 (FIG. 9C) are de-energized and windings 820 are energized (forward polarity) simultaneously with windings 830 (reverse polarity). This causes a magnetic flux to flow along path 835. As the respective rotor poles and stator poles line up, windings 820 and 830 (FIG. 9A) are de-energized and windings 735 and 740 are again energized as previously described to continue rotation. This process is repeated continuously to cause continuous rotation. The flow of magnetic flux along the flux path 750 is as follows. The flux leaves the stator pole 770 and enters rotor pole 760 where it continues through the rotor 580, through vane 838 (when said vane is positioned between two active rotor poles) and leaves through rotor pole 780 and enters stator pole 790 and travels back through the stator 510 to stator pole 770. This makes a complete magnetic circuit and each phase of operation uses a similar path. The flow of flux can be in either direction. The aforementioned flux path facilitates the use of the compact one piece stator by eliminating the need for an additional outer housing to complete the flux path. Each flux path used by the present invention is substantially shorter and has low reluctance, employs two stator windings to drive the flux both of which are energized simultaneously, and imparts torque to two rotor teeth thus increasing the efficiency and power of the unit. This flux path is effective in producing high torque per inch of rotor length with high efficiency and its effectiveness and efficiency is not diminished by increased or long rotor lengths and when combined with the rotary vane pump design its effectiveness and efficiency is not diminished by decreased or short rotor lengths thus eliminating these design restrictions. This flux path also facilitates the utilization of the switched reluctance motor designs described below.

In this illustration the magnetic fields (flux paths) move in the opposite direction of the rotor 580 (FIG. 9A) which turns clockwise in a three phase arrangement in which the rotor has twelve poles 630 evenly spaced thirty degrees apart and the stator has six stator poles 530 evenly spaced twenty degrees apart in a one hundred twenty degree radial section of the stator which is centered on the stationary shaft 660. This particular switched reluctance motor design may be described as a 18/12 design (18 stator poles/12 rotor poles) with two thirds of the stator and poles removed. This type of partial stator design provides for high efficiency, increased torque, increased horsepower, and high power density, by imparting rotation to the rotors in thirty-six separate ten degree steps with each step contributing equal amounts of torque and doing so in a three phase operation with each step a complete, efficient and torque producing magnetic circuit. This also provides a reduction in cost of manufacture by reducing the number of electronic switching devices and phases necessary for efficient operation. Other partial stator arrangements with a different number of phases, stator poles, rotor poles and different amounts of radial section which include the stator poles are possible such as a 18/12 (three phase) or 12/9 (four phase) design with one third of the stator and poles removed which could be utilized for high pressure service requirements by significantly increasing the torque produced. Fractional combinations are also possible such as 13 1/2/9 with fifteen twenty sevenths of the theoretical stator and poles removed leaving six stator poles in a three phase arrangement. As the rotor rotates the pumped medium is carried from the low pressure area of the pump 840 (FIGS. 9A and 11) to the high pressure area of the pump 845 by the cavities or pockets 850 (FIG. 9A) which are formed between the rotor 580, the vanes 723 and 726, the stator 510 and the endplates 670 and 680 (FIGS. 10 and 11). In this way the stator also functions as a rotary vane pump stator and the rotor also functions as rotary vane pump rotor. Negative pressure or vacuum is caused as the pocket volume increases during rotation thus drawing the pumped medium through the intake passage 720 (FIG. 7 and 11) and into the pump. As the maximum volume of the pocket is reached, the trailing vane 723 (FIG. 9A) passes the intake passage thus sealing the pocket. The leading vane 726 then passes the edge of the exhaust passage 730 (FIG. 7 and 11) and thus opens the pocket to the exhaust passage. As rotation continues the pocket volume decreases thus forcing the pumped medium out of the pocket and through the exhaust passage.

The electronic computer controller can be configured to maintain (up to design limits) flow regardless of pressure and/or pressure regardless of flow. The computer controller can accomplish this by continually monitoring the speed and the load through feedback from the windings and/or other sensors, and adjusting the electrical input to maintain the desired output pressure and/or flow of the unit thus eliminating the need for mechanical regulators, and over pumping thereby increasing efficiency and decreasing electrical consumption by pumping only at the rate necessary to maintain the desired output. It can also be used in conjunction with a demand sensing circuit to control and vary output as needed. Noise reduction can be accomplished by mounting audio transducers in the intake and exhaust passages adjacent to the endplate (or other advantageous areas) which are operated and controlled by the electronic computer controller to produce an audio signal which is equal in frequency, waveform, and amplitude but opposite in phase to the sound emitted from the pump/motor thus canceling out much of the noise emitted from the unit. This arrangement provides for less weight, smaller size and lower manufacturing cost by reducing or eliminating the need for conventional mufflers, sound insulation and/or a sound attenuating containment.

Although embodiments of this invention have been shown and described, it is to be understood that various modifications, substitutions and rearrangements of parts, components, and process steps, can be made by those skilled in the art without departing from the novel spirit and scope of this invention.

What is claimed is:

1. An electronically operated pump for creating a pumping action comprising:

a stator having an inner wall defining an aperture;

opposing endplates made of a non-magnetic material which are affixed to said stator and enclose said aperture to form a chamber;

a plurality of stator poles located in said stator;

each of said stator poles having a winding which forms a plurality of windings, said windings separated from said stator poles by a non-magnetic material and adapted to selectively energize said stator poles with a reverse or forward polarity;

a rotor having a plurality of rotor poles and a plurality of vanes;

said rotor located off center in said aperture; and an electronic control adapted to selectively energize said windings to create at least one magnetic flux, said flux passes through a forward polarity stator pole, two rotor poles, a reverse polarity stator pole and said stator whereby said rotor poles are attracted to said energized stator poles to create rotation of said rotor and said vanes whereby a pumping action is created.

2. The device of claim 1 wherein said vanes activate in said rotor and are moved outwardly by said rotation of said rotor.

3. The device of claim 1 wherein said vanes are comprised of a magnetic and non-magnetic material, said magnetic flux passes through said magnetic portion of said vanes.

4. The device of claim 1 wherein said magnetic flux passes through a path defined by two energized stator poles wherein said two energized stator poles are positioned less than 180 degrees apart and separated by at least one non-energized stator pole.

5. The device of claim 4 wherein said magnetic flux passes through a path defined by two rotor poles wherein said poles are positioned less than 180 degrees apart and separated by at least one rotor pole.

6. The device of claim 1 wherein said magnetic flux path travels in a direction opposite to the rotation of said rotor.

7. The device of claim 1 wherein said rotor has at least five poles and two vanes.

8. The device of claim 1 which includes at least four stator poles.

9. The device of claim 1 wherein said electronic control is adapted to also energize audio transducers to create an audio signal which is equal in amplitude and frequency but opposite in phase to the sound emitted from the pump to provide noise cancellation.

10. The device of claim 1 wherein the parts subject to friction and wear are coated with a friction and wear reducing material.

11. The device of claim 1 wherein said stator is made of a magnetic material.

* * * * *